(12) United States Patent
Bouckaert

(10) Patent No.: US 9,163,986 B2
(45) Date of Patent: Oct. 20, 2015

(54) METHOD AND SYSTEM FOR ENHANCING SPECTROMETER FUNCTION

(71) Applicant: The Boeing Company, Chicago, IL (US)

(72) Inventor: Anton M. Bouckaert, Simi Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 189 days.

(21) Appl. No.: 14/056,543

(22) Filed: Oct. 17, 2013

(65) Prior Publication Data

US 2015/0108333 A1 Apr. 23, 2015

(51) Int. Cl.
*G01J 3/28* (2006.01)

(52) U.S. Cl.
CPC .......................................... *G01J 3/28* (2013.01)

(58) Field of Classification Search
CPC .................................. G01J 3/28; G01J 3/2803
See application file for complete search history.

(56) References Cited

U.S. PATENT DOCUMENTS

2014/0268136 A1* 9/2014 Pawluczyk et al. ........... 356/326

OTHER PUBLICATIONS

"High-dynamic-range imaging," Wikipedia, http://en.wikipedia.org/wiki/High-dynamic-range_imaging (first publication at least as early as Feb. 10, 2011) (retrieved from the internet on Feb. 11, 2014).

* cited by examiner

*Primary Examiner* — Tony Ko
(74) *Attorney, Agent, or Firm* — Kevin Fields

(57) ABSTRACT

A method and system for enhancing spectrometer function may include initially exposing an array of photosensors of the spectrometer to spectral radiation and recording a first data set of photosensor counts within a predetermined measurement range; making a plurality of successive exposures of the photosensors to the radiation, and for each, progressively increasing an intensity of the radiation from the previous exposure, recording counts from the photosensors within the predetermined measurement range, disregarding counts from photosensors that already have recorded counts within the measurement range from a previous exposure to the radiation to make a data set of measured counts, and rescaling the data set of measured counts to adjust for the increasing an intensity of the spectral radiation to form a rescaled data set; and stitching together the first data set and each rescaled data set of measured counts to form a resultant data set of spectral irradiance.

20 Claims, 7 Drawing Sheets

METHOD AND SYSTEM FOR ENHANCING SPECTROMETER FUNCTION

FIELD

The disclosure relates to methods and systems for operating spectrometers, and more particularly, to methods and systems for enhancing the function of spectrometers.

BACKGROUND

A spectrometer is an instrument that measures the properties of electromagnetic radiation over a portion of the electromagnetic spectrum. The variable typically measured is the intensity of the radiation at each frequency across the portion of the spectrum measured. A spectrometer may include a component, such as a grating, that diffracts spectral radiation to which the spectrometer is exposed into component wavelengths and reflects each component wavelength in a different path across an array of photosensors of a detector associated with the spectrometer. A common type of photosensor is pixel.

The sensitivity of the photosensor array of a spectrometer varies with the wavelength of spectral radiation. For example, the sensitivity of the detector of a given spectrometer to incoming radiation at a wavelength of 550 nanometers (nm) may be very high, compared to the sensitivity of the photosensors of that spectrometer to spectral radiation at 800 nm. As a result, the spectral response for the detector array of a given spectrometer may be graphed as a curve.

Typically, sensitivity of a spectrometer detector is relatively low at the maximum and minimum wavelengths of the portion of the spectrum being measured. This characteristic may lead to noise that drowns out the data collected by the spectrometer. Accordingly, there is a need for a method and system for enhancing the spectral sensitivity of spectrometers that compensates for variations in spectral response of the array of photosensors of the detector across the portion of the electromagnetic spectrum being measured.

SUMMARY

In an embodiment, a method for enhancing spectrometer function may include making an initial exposure, of an array of photosensors of a spectrometer detector, to spectral radiation from a source of spectral radiation and recording a first data set of counts from the photosensors within a predetermined measurement range; making a plurality of successive exposures of the photosensors to the radiation, and for each of the plurality of successive exposures, progressively increasing an intensity of the radiation from a previous exposure, recording counts from the photosensors within the predetermined measurement range, disregarding counts from ones of the photosensors that already have recorded counts within the predetermined measurement range from a previous exposure to the radiation to make a data set of measured counts, and rescaling the data set of measured counts to adjust for the increasing an intensity of the radiation to form a rescaled data set; and stitching together the first data set and each rescaled data set of measured counts to form a resultant data set of spectral irradiance.

In another embodiment, a method for enhancing spectrometer function may include exposing an array of photosensors of a spectrometer detector to spectral radiation from a source of spectral radiation; determining a measurement range bounded by a saturation point and a starvation point of the array of photosensors; attenuating an intensity of the spectral radiation to which the array of photosensors is exposed to a first intensity value such that a raw count for no one of the photosensors exceeds the saturation point for any wavelength of the spectral radiation over the wavelength range measured by the detector; taking a first reading of the spectral radiation at the first intensity value and recording a first data set of photosensor counts; reducing attenuation of the spectral radiation from the first intensity value to a second intensity value; taking a second reading of the spectral radiation at the second intensity value and recording a second data set of photosensor counts; disregarding counts from ones of the photosensors that already have recorded counts within the measurement range from the first reading to make a second data set of measured photosensor counts, and storing the second data set of measured counts; rescaling the second data set of measured photosensor counts to adjust for the reducing the attenuation of the spectral radiation to the second intensity value; stitching together the first data set of photosensor counts and the rescaled second data set of measured photosensor counts to form a resultant data set of spectral irradiance; and performing one of displaying the resultant data set and storing the resultant data set.

In yet another embodiment, A system for enhancing spectrometer function may include a spectrometer having an input configured to receive spectral radiation from a source of spectral radiation and break the spectral radiation into a spectrum, and a detector including an array of photosensors configured to receive the spectrum; an attenuator configured to attenuate an intensity of spectral radiation to which the detector is exposed; and a control configured to actuate the spectrometer to make a first exposure of the array of photosensors to the source of spectral radiation to receive a first data set of counts from the array of photosensors, and actuate the spectrometer to make successive exposures of the array of photosensors to the source of spectral radiation to receive successive data sets of counts from the array of photosensors, and for each of the successive exposures, actuate the attenuator to progressively decrease attenuation of an intensity of the spectral radiation to which the detector is exposed, record data sets of photosensor counts of the array of photosensors, disregard counts from ones of the photosensors that already have recorded counts from previous exposures of the array of photosensors to arrive at a data set of measured counts, rescale the data set of measured counts to adjust for the decrease in attenuation of the spectral radiation, form a rescaled successive data set of measured counts, stitch together the recorded counts of the array of photosensors for the first data set and each rescaled successive data set of measured counts to form a resultant data set, and perform at least one of display the resultant data set and store the resultant data set.

Other objects and advantages of the disclosed method and system for enhancing spectrometer function will be apparent from the following description, the accompanying drawings, and the appended claims.

DETAILED DESCRIPTION

Figure 1:
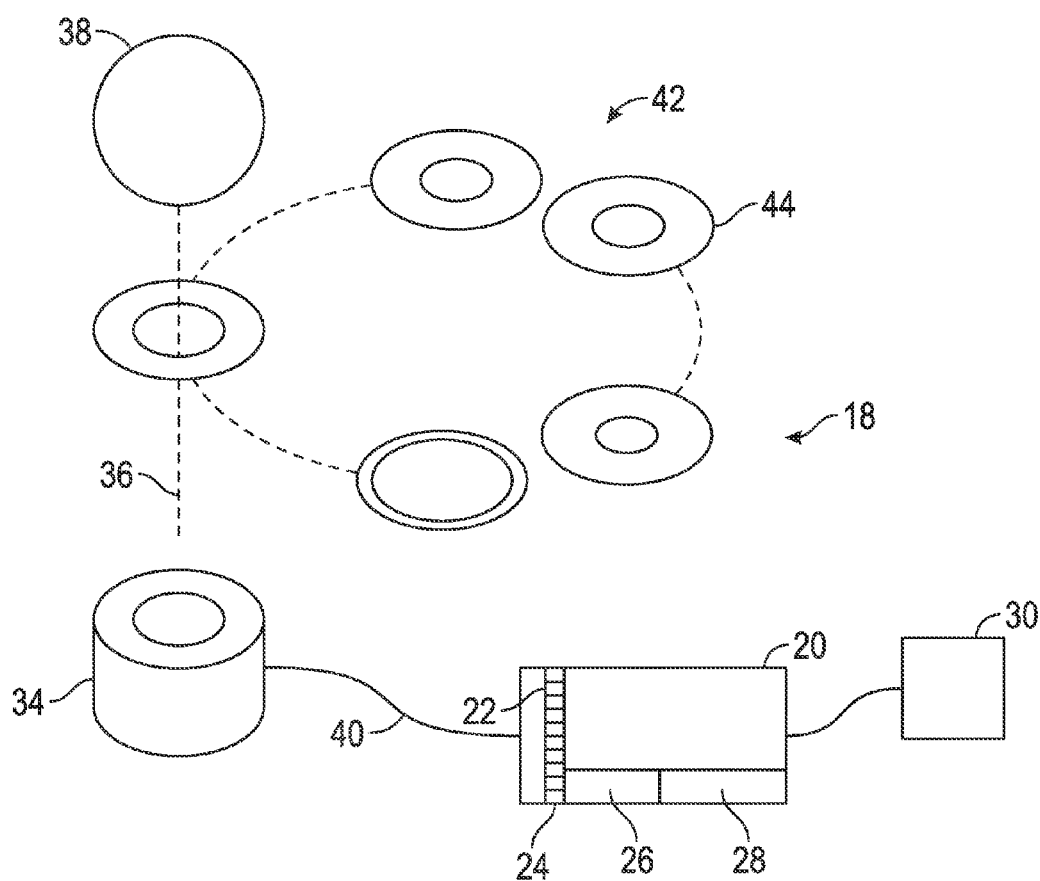
FIG. 1 is a schematic representation of an embodiment of the system for enhancing spectrometer function.

As shown in FIG. 1, the disclosed and system for enhancing spectrometer function, generally designated 18, may include a spectrometer, generally designated 20, of a type having an input that may be in the form of a detector 22 having an array of photosensors 24. The photosensors 24 may be in the form of pixels. The detector 22 may be configured to receive spectral radiation from a source of spectral radiation and break the spectral radiation into a spectrum that is received by the array of photosensors 24. Each of the photosensors 24 may be configured to receive a discrete wavelength or range of wavelengths of the portion of the electromagnetic spectrum to be measured by the spectrometer 20. The spectrometer 20 also may include storage 26 for storing counts made by the photosensors 24, and a display 28 for displaying the results of counts taken by the photosensors 24 from a reading in numerical and/or graphical form. The spectrometer 20 also may include a control 30 configured to receive a data set of counts from the array of photosensors 24, as well as successive data sets of counts from the array of photosensors.

In an embodiment, the system 18 may include an integrating sphere 34 that may be configured to receive spectral radiation 36 emanating from a source 38 of spectral radiation. The integrating sphere 34 may convey the spectral radiation 36 received from the source 38 to the detector 22 of the spectrometer 20 by a fiber optic cable 40.

The system 18 may include an attenuator, generally designated 42, configured to attenuate the intensity of the spectral radiation 36 received by the integrating sphere 34 from the source 38 and conveyed by the fiber optic cable 40 to the detector 22. In an embodiment, the attenuator 42 may include a plurality of aperture elements 44, which in an embodiment may take the form of apertures of different sizes. In an embodiment, the plurality of aperture elements 44 of the attenuator 42 may take the form of a plurality of neutral density filters, each of a different transmissivity.

In another embodiment, the attenuator 42 may be a fiber optic attenuator. In yet other embodiments, an attenuator 42 may not be utilized; rather, the time interval during which the detector 22 receives spectral radiation 36 from the source 38 of spectral radiation may be varied in duration. In still another embodiments, a combination of selecting a physical attenuator, such as aperture elements 44, which may be a plurality of apertures, a plurality of neutral density filters and/or a fiber optic attenuator, may be used in combination with varying a time of exposure of the detector 22 to spectral radiation 34 to vary intensity of spectral radiation 36 received by the spectrometer 20. In an embodiment, the control 30 may be configured to actuate the attenuator 42 to attenuate the spectral radiation 36 to which the array of photosensors 24 may be exposed to a pre-determined intensity.

Figure 2:
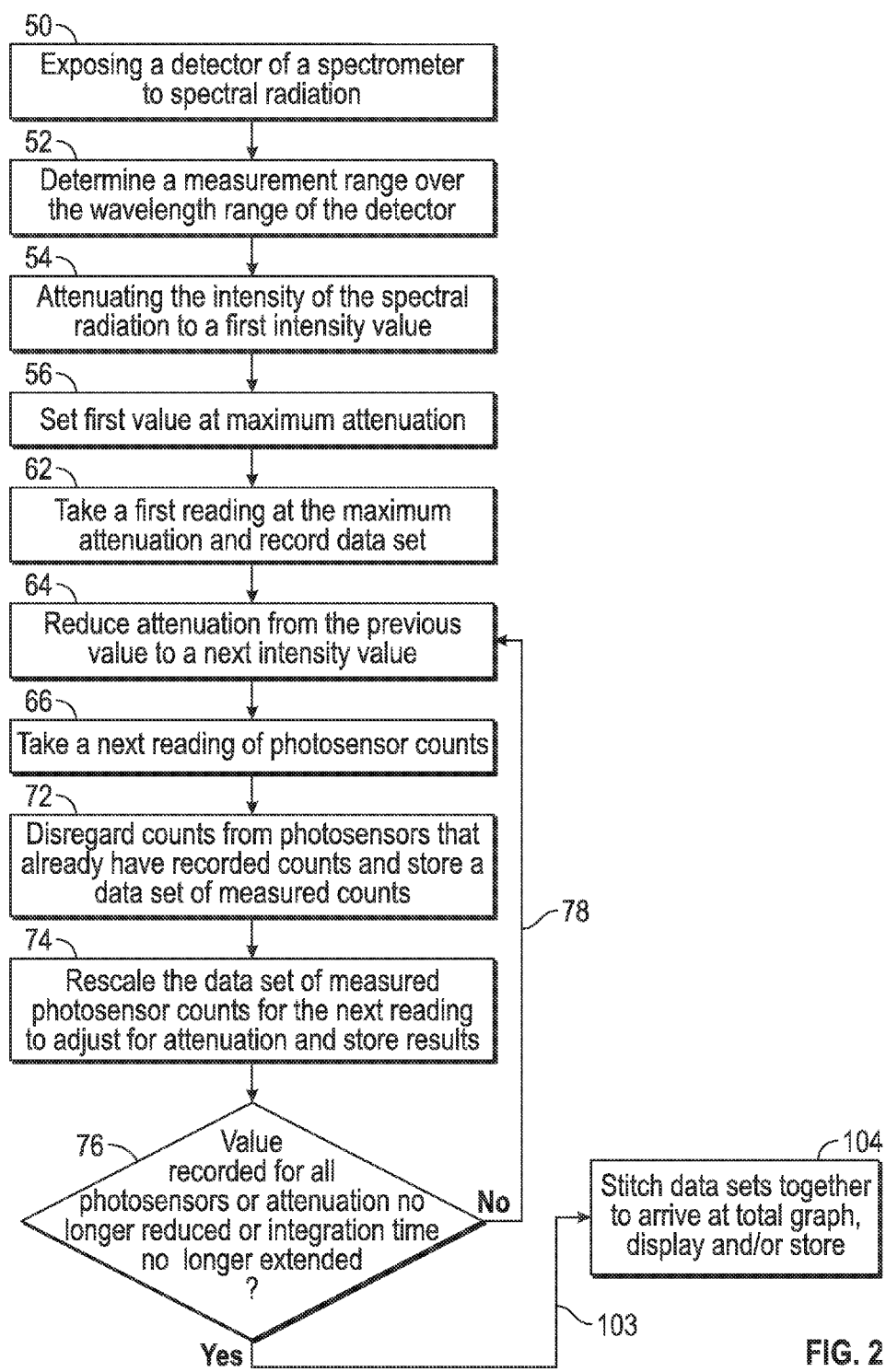
FIG. 2 is a flow chart depicting an embodiment of the disclosed method for enhancing spectrometer function.

An embodiment of the method for enhancing spectrometer function effected by the system 18 of FIG. 1 is set forth in the flowchart of FIG. 2. As shown in block 50, the method begins with an initial exposure of the array of photosensors 24 (FIG. 1) of the detector 22 of the spectrometer 20 to spectral radiation 36 from the source of spectral radiation 38. In embodiments, the initial exposure may be effected by directing spectral radiation 36 to the integrating sphere 34, from which it may then be transmitted by the fiber optic cable 40 to the detector 22. In other embodiments, the integrating sphere 34 may be positioned to receive spectral radiation 36 from the source of spectral radiation 38, which may be a stationary object or a moving object. In still other embodiments, the integrating sphere 34 (if one is utilized) and/or the spectrometer 20 may be mounted on a stationary platform (not shown), or on a moving vehicle, such as a land vehicle, an aircraft, a spacecraft, or a marine vessel.

As indicated in block 52, a predetermined measurement range may be selected for the wavelength range of the detector 20. As indicated in block 54, the attenuator 42 may be actuated by the computer 30 to attenuate (i.e., reduce the intensity of the spectral radiation 36 received by the integrating sphere 34 and detector 22) an intensity of the spectral radiation 36 to which the array of photosensors 24 is exposed to a first intensity value, such that a raw count for no one of the photosensors exceeds the saturation point for any wavelength of the spectral radiation over the wavelength range measured by the detector 22.

Figure 3:
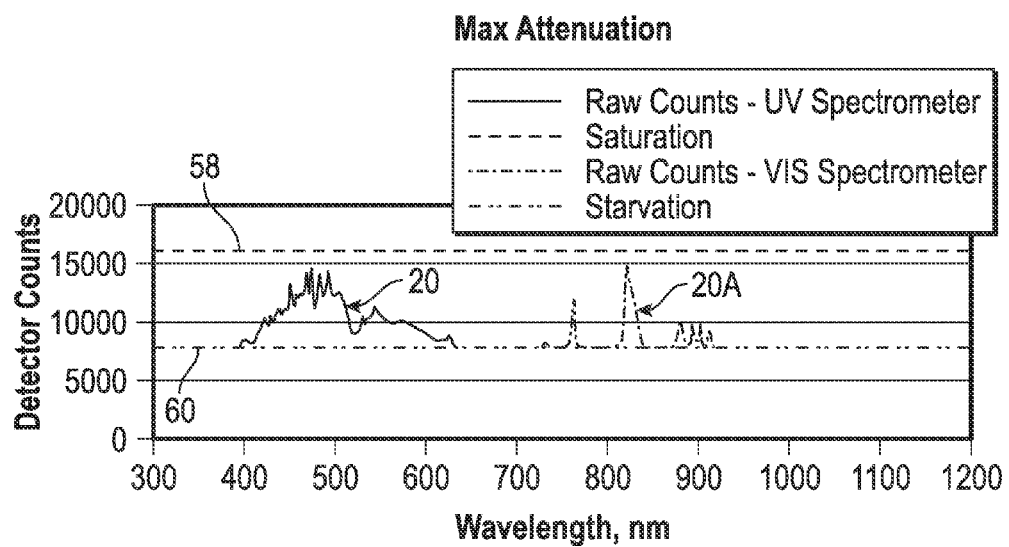
FIG. 3 is a graph of raw detector count measurement of spectral radiation taken by two spectrometers of a type depicted in FIG. 1, in which the attenuator is set at maximum attenuation.

In an embodiment, the raw detector counts for the first intensity value may be represented in FIG. 3 and, as indicated in block 56, is designated maximum attenuation. In the graph of FIG. 3, the predetermined measurement range may be bounded by a saturation point or an upper count value of 16,000 counts at line 58, above which the counts for photosensors 24 may no longer be proportional to irradiance, and a starvation point of 8,000 counts, indicated by line 60, below which successive measurements at the same intensity may not yield similar results within an acceptable tolerance. In embodiments, the starvation point represented by line 60 may be adjusted upwardly to increase the accuracy of the counts measured, or downwardly to decrease the accuracy of the counts measured.

In the embodiment depicted in FIG. 3, raw counts for two spectrometers, spectrometer 20 (an ultraviolet (UV) spectrometer) and spectrometer 20A (a visible imaging system (VIS) spectrometer), are shown for spectral radiation 36 from source 38 (FIG. 1). In an embodiment, the two spectrometers 20 and 20A each may have the same components as shown for system 18 in FIG. 1.

In an embodiment, attenuating the intensity of the spectral radiation 36 to which the detector 22 is exposed to the first intensity value may be selected from one or more of placing an aperture 44 of a first size between the source of spectral radiation 38 and the detector, placing a first neutral density filter between the source of spectral radiation and the detector, directing the spectral radiation upon the detector through a first fiber optic attenuator, and exposing the detector to spectral radiation for a first predetermined time interval.

As indicated at block 62, first readings are taken by the spectrometers 20, 20A within the measurement range at the maximum attenuation and first data sets of the detector counts of photosensors 24 of detector 22 are recorded and stored in storage 26 of the two spectrometers 20, 20A. As shown in FIG. 3, because of the attenuation of the spectral radiation 36 by attenuator 42, no counts would be recorded for wavelengths between 300 and approximately 400 nm, between approximately 640 and 760 nm, between 770 and 820 nm, between 850 and 880 nm, and beyond 930 nm.

As shown in block 64, the attenuation provided by attenuator 42 is reduced from the previous value to a next or second intensity value. In an embodiment depicted in FIG. 4, the attenuation may be reduced to 80% of the maximum attenuation, obtained by dividing the first intensity value by the second attenuation factor of 0.80, which results in a second intensity value of spectral radiation to which the detector 22 is exposed greater than the first intensity value. In an embodiment, the reduced attenuation may be determined by calculating a second attenuation factor by dividing photosensor 24 counts at the starvation point 60 (FIG. 3) by photosensor counts at the saturation point 58 of the detector. For example, if the ratio of starvation counts to saturation counts equals 0.75, the attenuation may be set at 80% (0.80) of maximum attenuation to allow some overlap.

In embodiments, reducing attenuation of the spectral radiation 36 from the first intensity value to the second intensity value may be selected from one or more of placing an aperture 42 of a second size between the source of spectral radiation 36 and the detector 22, placing a second neutral density filter between the source of spectral radiation and the detector, directing the spectral radiation upon the detector through a second fiber optic attenuator, and exposing the detector to spectral radiation for a second predetermined time interval. In embodiments, the control 30 may actuate the system 18 to achieve the second intensity value. For example, the second aperture 44 selected may have a size greater than the size of the first aperture selected, the second neutral density filter may have an optical density less than an optical density of the first neutral density filter (i.e., it may have greater transmissivity), the second fiber optic attenuator may attenuate the spectral radiation less than the first fiber optic attenuator, and/or the second time interval may be longer than the first time interval.

Figure 4:
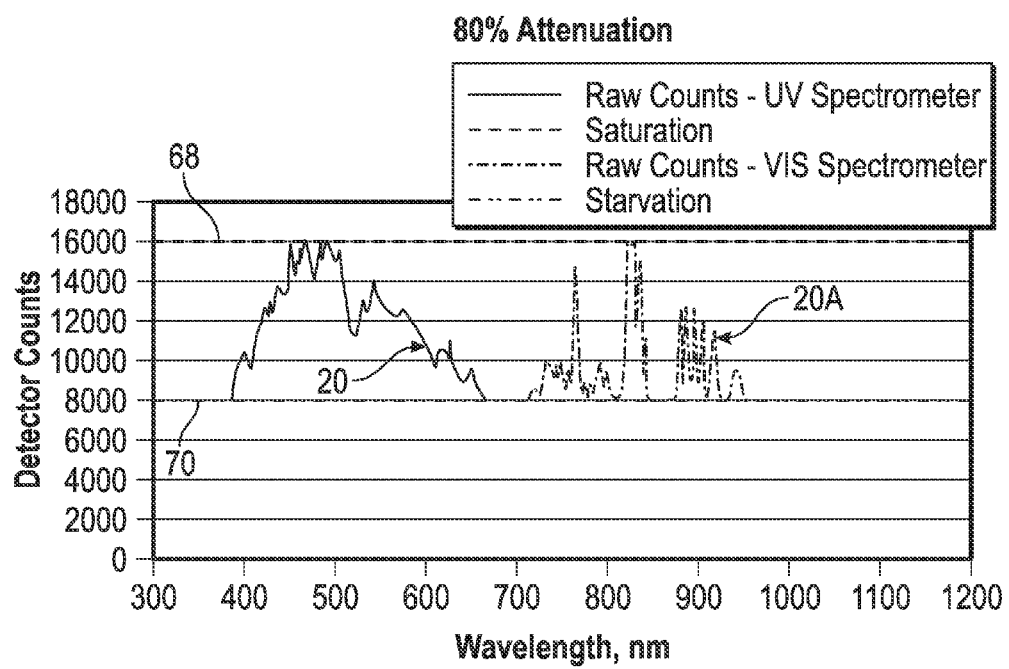
FIG. 4 is a graph of raw detector count measurement of spectral radiation taken by the spectrometers of FIG. 3, in which the attenuator is set at 80% of maximum attenuation.

As shown in FIG. 4 and indicated in block 66 of FIG. 2, a second reading may be taken by the spectrometers 20, 20A of counts within the measurement range for the spectral radiation 36 at the second intensity value. The depicted raw detector counts may be combined into a second data set of photosensor counts recorded by the spectrometers 20, 20A or control 30 for those photosensors 24 of the detector 22 that receive detector counts within the measurement range bounded by lines 68 (16,000 counts) and 70 (8,000 counts). As is apparent in FIG. 4, photosensors measuring frequencies of incoming spectral radiation 36 at approximately 460 nm, 500 nm, and 850 nm may be saturated. Photosensors measuring spectral radiation between 300 and 390 nm, between 670 and 710 nm, between 850 and 870 nm, and beyond 960 nm are outside the measurement range and do not generate enough counts to be recorded in a data set for that measurement.

As indicated in block 72 of FIG. 2, the control 30 then disregards counts from ones of the photosensors 24 that already have recorded counts within the measurement range from the first reading to make a second (after the reading at maximum attenuation) or next data set of measured photosensor counts, and a data set of the remaining or measured photosensor counts may be stored in storage 26. In other words, the control 30 may construct the second or next data set by measuring and recording counts only from those photosensors 24 that have not registered counts within the measurement range in previous data sets. This data set of measured photosensor counts for the subsequent reading (which may be the second reading in this iteration) may be rescaled to adjust for the reduced attenuation of the spectral radiation 36 to the second intensity value (in this iteration), and the rescaled second data set of measured photosensor counts stored. In this iteration, the counts may be divided by the percent of attenuation (80% in this iteration) to effect rescaling and stored, as indicated in block 74.

As indicated in block 76, the control 30 may determine whether a value has been recorded for all photosensors 24 of the detectors 22 of the spectrometers 20, 20A, or whether attenuation cannot be reduced further, or whether integration time cannot be extended. In this embodiment, since count values have not been recorded for all photosensors 24, attenuation the control 30 may actuate the attenuator 42 to reduce attenuation further (either in the form of adjusting an aperture, neutral density filter, or fiber optic cable) and/or spectrometer 20 integration time extended, the process begins again, as indicated by line 78.

As indicated at block 64, the control 30 may actuate the attenuator 42 to reduce the attenuation further, thereby increasing the amount of spectral radiation 36 received by the detector 22, and from there transmitted to the detector 22. In the graph of raw counts shown in FIG. 5, the attenuation may be reduced to 67% of the maximum attenuation depicted in FIG. 3, yielding spectral radiation 36 of a third intensity value, greater than the first and second intensity values. A next or third data set of detector counts is detected within the measurement range between a saturation level indicated by line 80 (16,000 counts) and a starvation level indicated by line 82 (8,000 counts) for spectrometers 20 and 20A is taken and stored. It should be noted that photosensors 24 associated with lower frequencies, such as below 400 nm, may now be receiving counts. This next reading may be indicated in block 66.

Figure 5:
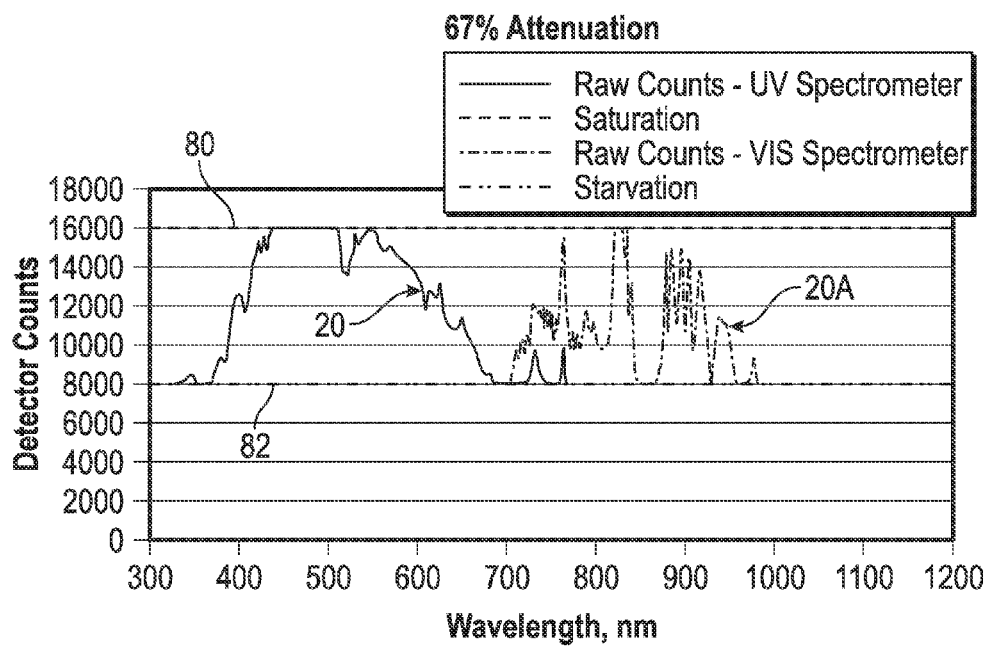
FIG. 5 is a graph of raw detector count measurement of spectral radiation taken by the spectrometers of FIG. 3, in which the attenuator is set at 67% of maximum attenuation.

As indicated in block 72, the control 30 may reduce the photosensor counts from this next data set represented by FIG. 5 by disregarding counts from photosensors that already have recorded counts within the measurement range in the previous readings depicted in FIGS. 3 and 4, and a data set of the remaining measured photosensor counts is stored in storage 26, as indicated in block 72. As indicated in block 74, this third data set of measured photosensor counts is rescaled to adjust for reducing the attenuation of the spectral radiation to the third intensity value. In the embodiment of FIG. 5, the rescaling may be in the form of dividing the data set represented by FIG. 5 by the attenuation factor (0.67).

Figure 6:
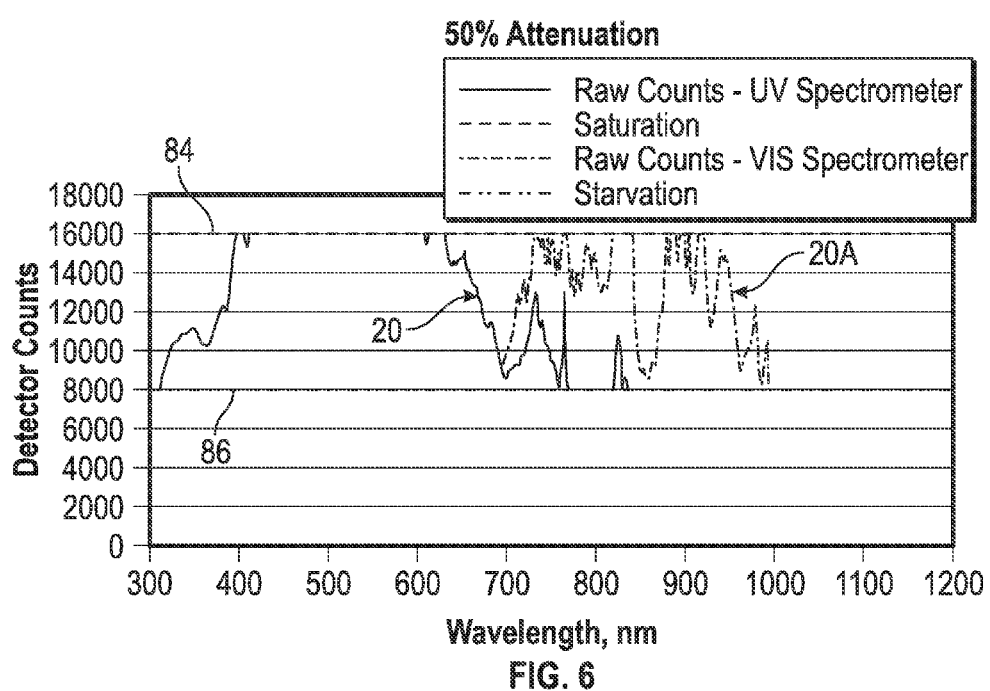
FIG. 6 is a graph of raw detector count measurement of spectral radiation taken by the spectrometers of FIG. 3, in which the attenuator is set at 50% of maximum attenuation.

As indicated in block 76, since values have not been recorded for all photosensors 24, and it is possible to further reduce attenuation, the process is repeated again for a next subsequent measurement range. As indicated by the graph of raw counts shown in FIG. 6, an attenuation reduction of 50% of the maximum attenuation is made and an exposure of the array of photosensor 24 to the source of spectral radiation 38 may be made, within a measurement range between a saturation point indicated at line 84 (16,000 counts) and a starvation point indicated at line 86 (8,000 counts). The control 30 disregards counts from photosensors 24 that already have contributed counts to previous data sets (i.e., photosensors 24 that have received counts within the measurement range), and the counts recorded for the remaining photosensors 24 are used to form a data set of measured counts, which is rescaled by control 30 to form a rescaled data set of measured counts, and may be stored in storage 26, or within control 30.

Figure 7:
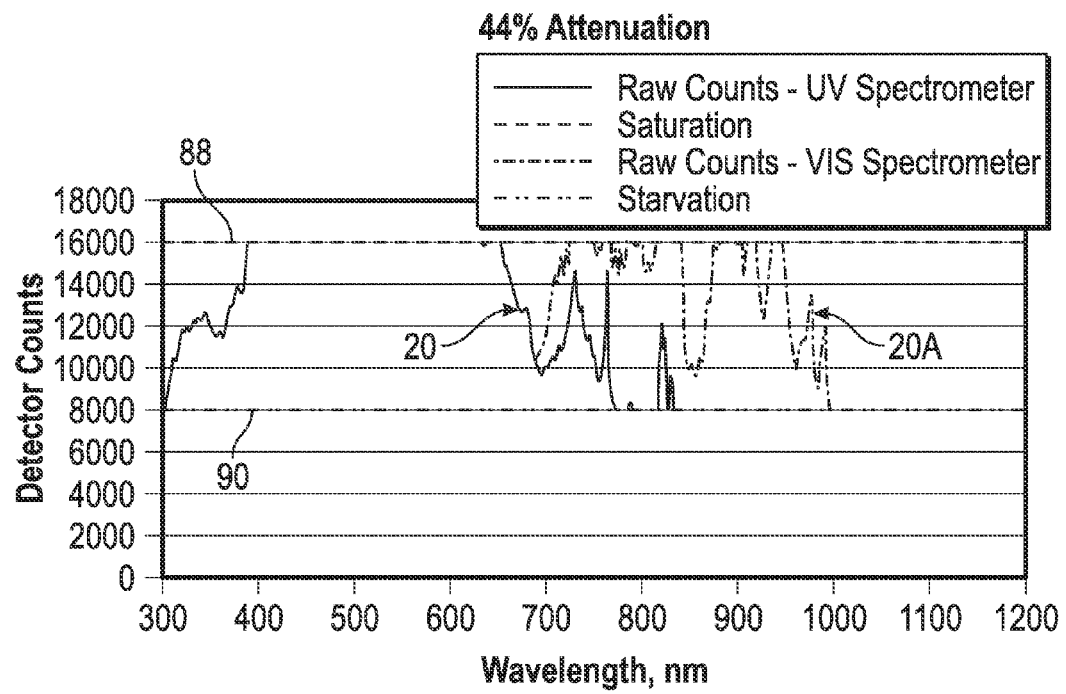
FIG. 7 is a graph of raw detector count measurement of spectral radiation taken by the spectrometers of FIG. 3, in which the attenuator is set at 44% of maximum attenuation.
Figure 8:
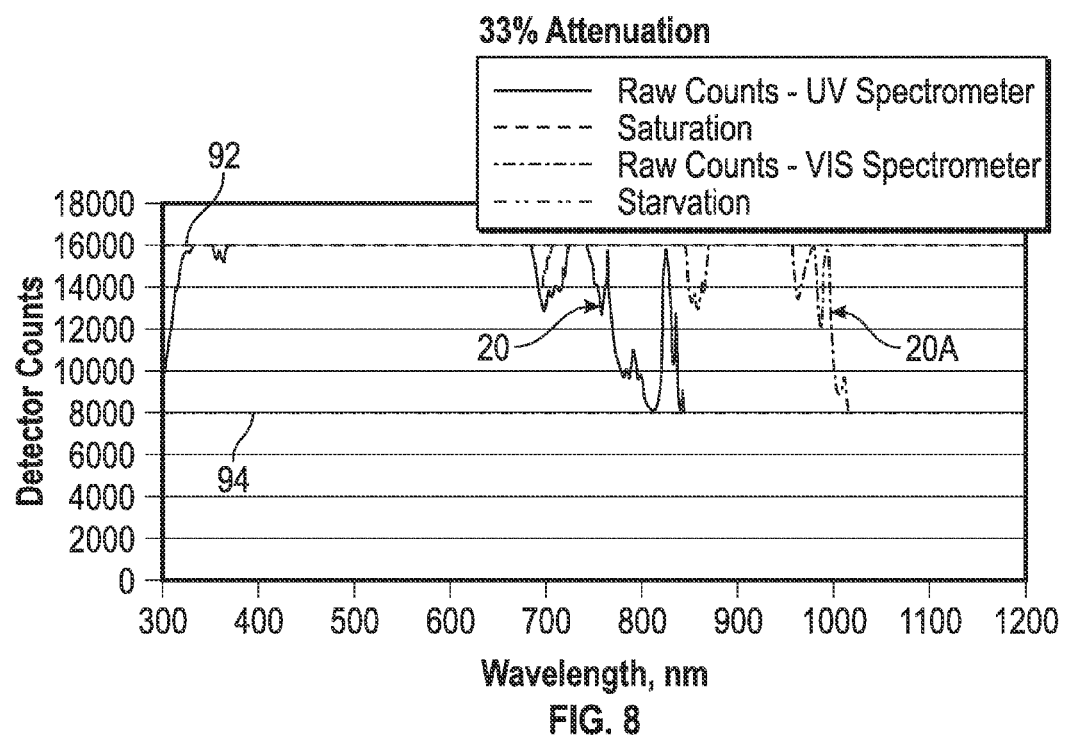
FIG. 8 is a graph of raw detector count measurement of spectral radiation taken by the spectrometers of FIG. 3, in which the attenuator is set at 33% of maximum attenuation.
Figure 9:
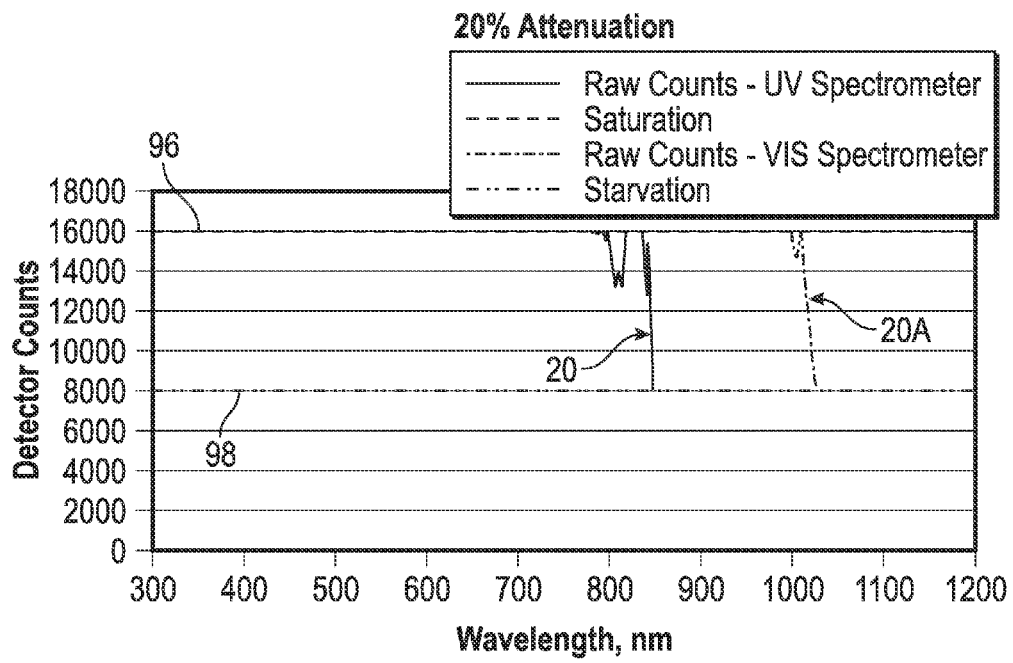
FIG. 9 is a graph of raw detector count measurement of spectral radiation taken by the spectrometers of FIG. 3, in which the attenuator is set at 20% of maximum attenuation.
Figure 10:
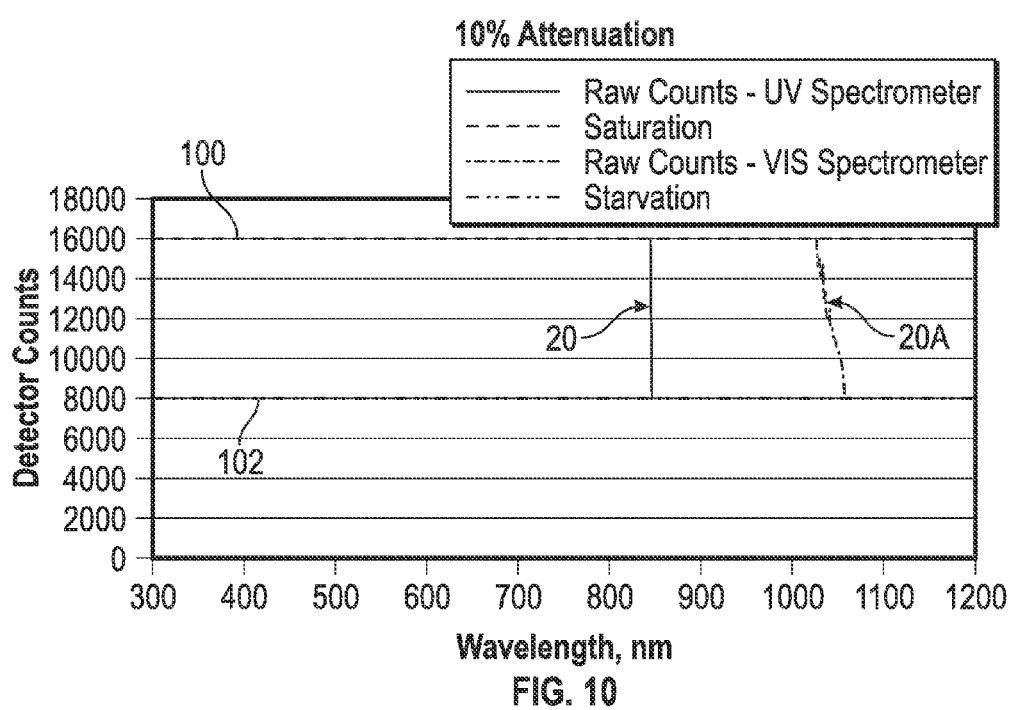
FIG. 10 is a graph of raw detector count measurement of spectral radiation taken by the spectrometers of FIG. 3, in which the attenuator is set at 10% of maximum attenuation.

As shown in FIGS. 7, 8, 9, and 10, this process indicated at blocks 64, 66, 72, 74, and 76 is repeated for successive iterations of measurement cycles, and for each iteration reducing further the attenuation of the spectral radiation 36 to which the detectors 22 of spectrometers 20, 20A are exposed. Specifically, in embodiments, FIG. 7 represents graph of raw photosensor counts for measurement taken by spectrometers 20, 20A recorded in the measurement range between lines 88, 90 for an attenuation of 44% of the maximum attenuation. Similarly, FIG. 8 represents a graph of raw photosensor counts taken by spectrometers 20, 20A for 33% of maximum attenuation within the measurement range between saturation and starvation lines 92, 94, respectively. FIG. 9 represents a graph of raw detector counts for spectrometers 20, 20A taken at 20% of maximum attenuation within a measurement range between saturation and starvation lines 96, 98, respectively. FIG. 10 depicts a graph of raw detector counts of spectrometers 20, 20A taken at 10% of maximum attenuation within a measurement range between saturation and starvation lines 100, 102.

Thus FIGS. 7, 8, 9, and 10 represent a graphs of raw detector counts taken by the spectrometers 20, 20A for successive cycles of reducing attenuation of the spectral radiation 36 to a next intensity value. The control 30 may actuate the spectrometers 20, 20A to take a reading by the detectors 22 at that next intensity value, and store the next or successive data set of the photosensor counts, disregard counts from ones of the photosensors 24 that already have recorded counts within the measurement range a previous reading, and storing a next or successive data set of measured photosensor counts, rescaling the next or successive data set of measured photosensor counts, and storing the rescaled next or successive data set of measured photosensor counts in storage 26.

Figure 11:
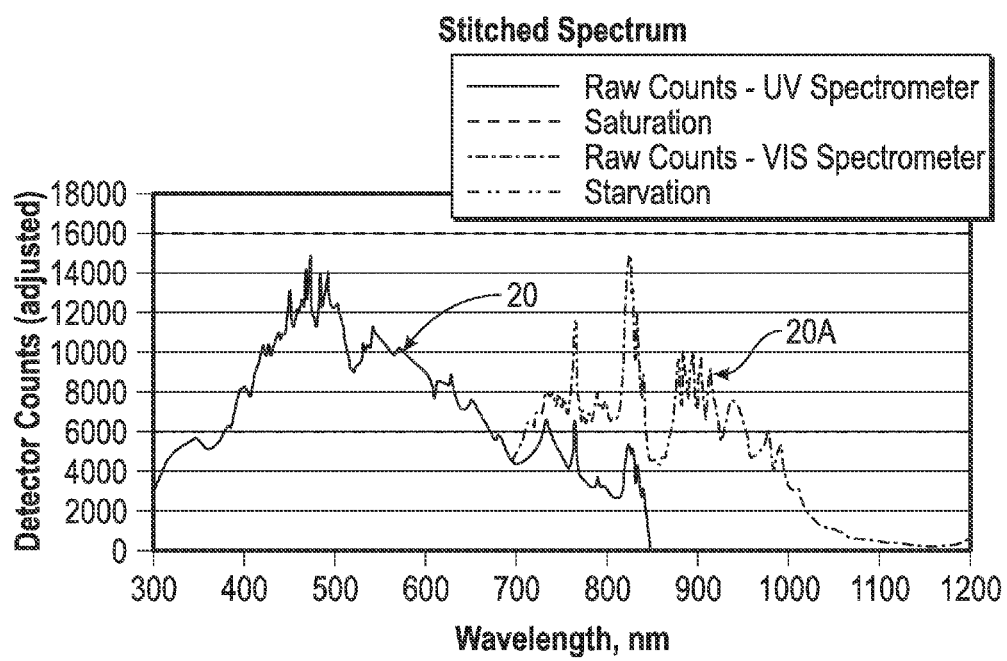
FIG. 11 is a graph in which the measurements depicted in FIGS. 3-10 have been stitched together.

After the data set is are recorded for the rescaled measured photosensor counts of FIG. 10, as indicated in block 76 (FIG. 2) the control 30 may determine that values have been recorded for all photosensors 24, and as indicated by line 103, the method may proceed to block 104. As indicated in block 104, the photosensor counts that have been stored for each of the measurements represented by FIGS. 3-10 may be stitched together as shown in the graph depicted in FIG. 11. In an embodiment, this step may include stitching together the first data set of photosensor counts and the rescaled second data set of measured photosensor counts to form a resultant data set of spectral irradiance. In another embodiment, this step may include stitching together the rescaled third data set of measured photosensor counts to the first data set of photosensor counts and the rescaled second data set of measured photosensor counts to form a resultant data set of spectral irradiance.

Figure 12:
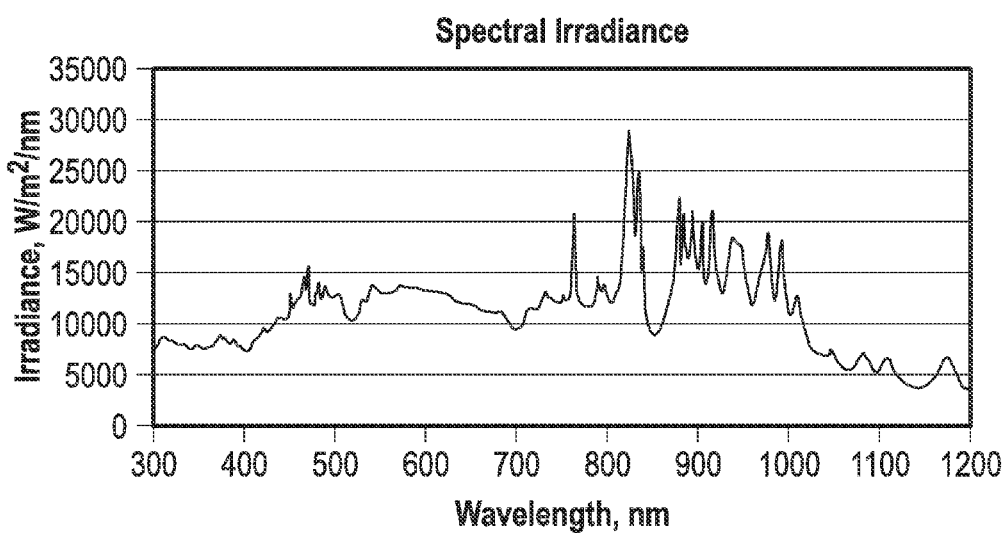
FIG. 12 is a graph of the spectral radiation measured by the spectrometers of FIG. 3 in which the raw detector counts have been multiplied by calibration curves for the spectrometers to obtain spectral irradiance.

As indicated in the graph shown in FIG. 12, the stitched together data sets of raw detector counts then may be multiplied by a calibration curve to obtain the spectral irradiance for the spectrometers 20, 20A. The calibration curve may be known for the particular spectrometers 20, 20A utilized in taking the measurements. The curve may be stored in storage 26, and/or displayed in graphical and/or numerical form as a data set corresponding to radiation intensity of the spectral radiation 36 over the wavelength range measured by the spectrometers 20, 20A on display 28 by control 30.

As is apparent from the preceding description, the disclosed method and system, which employs a single spectrometer that is exposed to multiple intensities of spectral radiation, the areas of lower quantum efficiency may be enhanced by data from a high intensity measurement, while areas of higher quantum efficiency may be ignored when the respective photosensors are saturated, and the lower density measurement data may be used. This method and system allows low cost spectrometers to be used in place of expensive, multi-spectrometer systems. The method may be implemented in any spectrometer software to enhance the efficiency of the spectrometer system across an entire spectral response range.

While the methods and forms of apparatus herein disclosed constitute preferred embodiments, it is to be understood that the disclosed method and system for enhancing spectrometer function is not limited to these precise forms of apparatus and methods, and that changes may be made therein without departing from the scope of the disclosure.

What is claimed is:

1. A method for enhancing spectrometer function, the method comprising:
    making an initial exposure, of an array of photosensors of a spectrometer detector, to spectral radiation and recording a first data set of counts from the photosensors within a predetermined measurement range;
    making a plurality of successive exposures of the photosensors to the radiation, and for each of the plurality of successive exposures,
        progressively increasing an intensity of the radiation from a previous exposure,
        recording counts from the photosensors within the predetermined measurement range,
        disregarding counts from ones of the photosensors that already have recorded counts within the measurement range from a previous exposure to the radiation to make a data set of measured counts, and
        rescaling the data set of measured counts to adjust for the increasing an intensity of the radiation to form a rescaled data set; and
    stitching together the first data set and each rescaled data set of measured counts to form a resultant data set of spectral irradiance.

2. The method of claim 1, further comprising performing at least one of displaying the resultant data set and storing the resultant data set.

3. The method of claim 1, further comprising, prior to the initial exposure, attenuating the spectral radiation to which the array of photosensors is exposed to a first intensity value sufficient to prevent saturation of the photosensors.

4. The method of claim 3, wherein progressively increasing the intensity of the spectral radiation includes progressively reducing an amount of attenuation of the spectral radiation to increase an intensity of spectral radiation to which the array of photosensors is exposed above the first intensity value.

5. The method of claim 1, further comprising ceasing the making of a plurality of successive exposures when one or both of a value has been recorded for all photosensors, and attenuation of the spectral radiation can no longer be reduced.

6. A method for enhancing spectrometer function, the method comprising:
    exposing an array of photosensors of a spectrometer detector to spectral radiation from a source of spectral radiation;
    determining a measurement range bounded by a saturation point and a starvation point of the array of photosensors;
    attenuating an intensity of the spectral radiation to which the array of photosensors is exposed to a first intensity value such that a raw count for no one of the photosensors exceeds the saturation point for any wavelength of the spectral radiation over the wavelength range measured by the detector;

taking a first reading of the spectral radiation at the first intensity value and recording a first data set of photosensor counts;

reducing attenuation of the spectral radiation from the first intensity value to a second intensity value;

taking a second reading of the spectral radiation at the second intensity value and recording a second data set of photosensor counts;

disregarding counts from ones of the photosensors that already have recorded counts within the measurement range from the first reading to make a second data set of measured photosensor counts, and storing the second data set of measured counts;

rescaling the second data set of measured photosensor counts to adjust for the reducing the attenuation of the spectral radiation to the second intensity value;

stitching together the first data set of photosensor counts and the rescaled second data set of measured photosensor counts to form a resultant data set of spectral irradiance; and performing one of displaying the resultant data set and storing the resultant data set.

7. The method of claim 6, wherein reducing attenuation of the spectral radiation from the first intensity value to the second intensity value includes selecting a second intensity value that is greater than the first intensity value.

8. The method of claim 7, wherein selecting a second intensity value includes calculating a second attenuation factor by dividing photosensor counts at the starvation point by photosensor counts at the saturation point of the detector.

9. The method of claim 8, wherein selecting a second intensity value includes dividing the first intensity value by the second attenuation factor.

10. The method of claim 9, wherein rescaling the measured value includes dividing the measured value of the second reading by the second attenuation factor.

11. The method of claim 6, further comprising:
reducing attenuation of the spectral radiation from the second intensity value to a third intensity value;
taking a third reading at the third intensity value and recording a third data set of photosensor counts;
disregarding the photosensor counts from ones of the photosensors that already have recorded counts within the measurement range from the first reading and the second reading, and storing a third data set of measured photosensor counts;
rescaling the third data set of measured photosensor counts to adjust for the reducing the attenuation of the spectral radiation to the third intensity value;
stitching together the rescaled third data set of measured photosensor counts to the first data set of photosensor counts and the rescaled second data set of measured photosensor counts to form a resultant data set of spectral irradiance; and
the performing one of displaying and storing the resultant data set includes performing one of displaying and storing the resultant data set.

12. The method of claim 11, further comprising successive cycles of reducing attenuation of the spectral radiation to a next intensity value, taking a reading at the next intensity value and storing a next data set of the photosensor counts, disregarding counts from ones of the photosensors that already have recorded counts from the previous readings within the measurement range and storing the successive data set of measured counts, rescaling the successive data set of measured counts, stitching together the successive data set of measured counts to the first data set of photosensor counts and stored data sets of measured counts to form a resultant data set of spectral irradiance, and performing one of displaying and storing the resultant data set.

13. The method of claim 12, further comprising ceasing the successive cycles when one or both of a count has been recorded for each of the photosensors, and attenuation of the spectral radiation can no longer be reduced.

14. The method of claim 6, wherein providing a spectrometer having a detector including an array of photosensors configured to detect radiation over a wavelength range includes providing photosensors in the form of an array of pixels.

15. The method of claim 6, wherein attenuating an intensity of the spectral radiation to which the detector is exposed to the first intensity value is selected from one or more of placing an aperture of a first size between the source of spectral radiation and the detector, placing a first neutral density filter between the source of spectral radiation and the detector, directing the spectral radiation upon the detector through a first fiber optic attenuator, and exposing the detector to spectral radiation for a first predetermined time interval.

16. The method of claim 15, wherein the reducing attenuation of the spectral radiation from the first intensity value to the second intensity value is selected from one or more of placing an aperture of a second size between the source of spectral radiation and the detector, placing a second neutral density filter of a second transmissivity between the source of spectral radiation and the detector, directing the spectral radiation upon the detector through a second fiber optic attenuator, and exposing the detector to spectral radiation for a second predetermined time interval.

17. The method of claim 16, wherein the second aperture size is greater than the first aperture size, the second neutral density filter has an optical density less than an optical density of the first neutral density filter, the second fiber optic attenuator attenuates the spectral radiation less than the first fiber optic attenuator, and the second time interval is longer than the first time interval.

18. A system for enhancing spectrometer function, the system comprising:
a spectrometer having an input configured to receive spectral radiation from a source of spectral radiation and break the spectral radiation into a spectrum, and a detector including an array of photosensors configured to receive the spectrum;
an attenuator configured to attenuate an intensity of spectral radiation to which the detector is exposed; and
a control configured to
actuate the spectrometer to make a first exposure of the array of photosensors to the source of spectral radiation to receive a first data set of counts from the array of photosensors, and
actuate the spectrometer to make successive exposures of the array of photosensors to the source of spectral radiation to receive successive data sets of counts from the array of photosensors, and for each of the successive exposures, actuate the attenuator to progressively decrease attenuation of an intensity of the spectral radiation to which the detector is exposed, record data sets of photosensor counts of the array of photosensors, disregard counts from ones of the photosensors that already have recorded counts from previous exposures of the array of photosensors to arrive at a data set of measured counts, rescale the data set of measured counts to adjust for the decrease in attenuation of the spectral radiation, form a rescaled successive data set of measured counts, stitch together the recorded counts of the array of photosensors for the first data set and each rescaled successive data set of measured counts to form a resultant data set, and perform at least one of display the resultant data set and store the resultant data set.

19. The system of claim 18, wherein the control is configured to actuate the attenuator to attenuate the spectral radiation to which the array of photosensors is exposed to a first intensity value sufficient to prevent saturation of the photosensors.

20. The system of claim 19, wherein the control is configured to cease making the plurality of successive exposures when one or both of a value has been recorded for all photosensors, and attenuation of the spectral radiation can no longer be reduced.

\* \* \* \* \*